US009678502B2

(12) United States Patent
Taylor et al.

(10) Patent No.: US 9,678,502 B2
(45) Date of Patent: Jun. 13, 2017

(54) PROCESS CONTROL OF AN INDUSTRIAL PLANT

(71) Applicant: Auckland Uniservices Limited, Auckland (NZ)

(72) Inventors: Mark P. Taylor, Auckland (NZ); John J. J. Chen, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 14/254,480

(22) Filed: Apr. 16, 2014

(65) Prior Publication Data
US 2014/0316579 A1 Oct. 23, 2014

Related U.S. Application Data

(63) Continuation of application No. 12/376,760, filed as application No. PCT/NZ2007/000211 on Aug. 6, 2007, now abandoned.

(30) Foreign Application Priority Data

Aug. 9, 2006 (AU) ................................. 2006904359

(51) Int. Cl.
*G05B 19/418* (2006.01)
*G05B 11/01* (2006.01)
(Continued)

(52) U.S. Cl.
CPC .......... *G05B 19/41835* (2013.01); *C25C 3/06* (2013.01); *C25C 3/20* (2013.01);
(Continued)

(58) Field of Classification Search
CPC .......... G05B 19/41835; G05B 23/0294; G05B 11/01; G05B 2219/32009; G05B 2219/31455; C25C 3/20; C25C 3/06
(Continued)

(56) References Cited

U.S. PATENT DOCUMENTS 5,089,093 A 2/1992 Blatch et al.
5,311,562 A 5/1994 Palusamy et al.
(Continued)

FOREIGN PATENT DOCUMENTS

FR 2713360 A1 6/1995
JP 05-322603 12/1993

OTHER PUBLICATIONS

"Control and Application of Chaos in Electrical System" by Zhaoming Lei et al.; in proceedings of the Fourth Itnernational Conference on "Machine Learning and Cybernetics" hold in Guangzhou, Aug. 18-21, 2005, pp. 1477-1481 of vol. 3 (and in particular see chapter 4.2); ISBN 0-7803-9091-1; Digital Object Identifier: 10.1109/ICMLC.2005. 1527177.

(Continued)

*Primary Examiner* — Charles Kasenge
(74) *Attorney, Agent, or Firm* — Benesch, Friedlander, Coplan and Aronoff LLP

(57) ABSTRACT

A system 10 for controlling an industrial plant 12 comprises automatic control equipment 14 comprising a plurality of measurement sensors 16 for sensing predetermined variables associated with components of the industrial plant 12. The sensors 16 generate measured data relating to operation of the components of the industrial plant 12. A database 20 contains operational data, including observational data, regarding the industrial plant 12. A processor 18 is in communication with the automatic control equipment 14 and the database 20 for receiving the measured data from the sensors 16 of the automatic control equipment 14 and the operational data from the database 20. The processor 18 manipulates the measured and operational data to provide an evolving description of a process condition of each component over time, along with output information relating to (Continued)

operational control of the industrial plant 12 and for updating the database 20.

18 Claims, 8 Drawing Sheets

(51) Int. Cl.
   *C25C 3/06* (2006.01)
   *C25C 3/20* (2006.01)
   *G05B 23/02* (2006.01)

(52) U.S. Cl.
   CPC .......... G05B 11/01 (2013.01); G05B 23/0294 (2013.01); *G05B 2219/31455* (2013.01); *G05B 2219/32009* (2013.01)

(58) Field of Classification Search
   USPC ...... 700/108, 109, 110, 275; 702/81, 82, 83, 702/84, 182, 183, 184, 185; 706/12; 707/802, E17.005
   See application file for complete search history.

(56) References Cited

U.S. PATENT DOCUMENTS

| | | | |
|---|---|---|---|
| 5,339,257 A | 8/1994 | Layden et al. | |
| 5,559,691 A * | 9/1996 | Monta | G21D 3/00 700/83 |
| 6,010,611 A | 1/2000 | Haverkamp et al. | |
| 6,273,931 B1 | 8/2001 | Denys | |
| 6,618,632 B1 * | 9/2003 | Federl | G05B 23/0221 700/110 |
| 6,738,682 B1 | 5/2004 | Pasadyn | |
| 6,757,579 B1 | 6/2004 | Pasadyn | |
| 6,816,815 B2 * | 11/2004 | Takayama | G05B 23/0283 700/9 |
| 6,892,107 B2 * | 5/2005 | Baba | G05B 23/0272 700/108 |
| 7,016,743 B1 | 3/2006 | Cheng | |
| 7,085,610 B2 | 8/2006 | Eryurek et al. | |
| 7,623,932 B2 | 11/2009 | Miller et al. | |
| 2002/0010562 A1 | 1/2002 | Schleiss et al. | |
| 2002/0038156 A1 | 3/2002 | Eryurek et al. | |
| 2003/0115510 A1 * | 6/2003 | Takayama | G05B 23/0283 714/47.1 |
| 2004/0030429 A1 * | 2/2004 | Baba | G05B 23/0272 700/108 |
| 2004/0083057 A1 | 4/2004 | Trost et al. | |
| 2005/0015217 A1 | 1/2005 | Weidl et al. | |
| 2005/0043922 A1 | 2/2005 | Weidl et al. | |
| 2005/0049988 A1 | 3/2005 | Dahlquist et al. | |
| 2006/0047454 A1 | 3/2006 | Tamaki et al. | |
| 2006/0058904 A1 | 3/2006 | Trost et al. | |
| 2006/0287773 A1 | 12/2006 | Andersen et al. | |

OTHER PUBLICATIONS

PCT International Search Report and Written Opinion of the International Searching Authority, Apr. 29, 2008.

* cited by examiner

PROCESS CONTROL OF AN INDUSTRIAL PLANT

RELATED APPLICATIONS

This application is a Continuation application under 35 U.S.C. 111(a) of U.S. non-provisional application Ser. No. 12/376,760 filed on Jul. 9, 2010, which is a National Stage Entry application of PCT/NZ2007/000211 Filed on Aug. 6, 2007.

FIELD OF THE INVENTION

This invention relates to process control of an industrial plant. More particularly, the invention relates to a system for, and a method of, controlling an industrial plant particularly, but not necessarily exclusively, a smelting plant.

BACKGROUND TO THE INVENTION

The present demand for an increasingly rapid financial return in industrial plants such as smelting operations has driven operating parameters beyond their current performance limits. This has resulted in reduction in the lives of operating components of the plant, reduced operating efficiencies and reduction in product quality. The ever present need to reduce carbon and/or other greenhouse gas emissions is adding additional pressure to the situation. In the case of smelting operations, the control systems that are in use were implemented in the early 1980s whereas productivity, raw materials supply, energy price and environmental issues associated with the industry have intensified considerably since that time. Furthermore, the flexibility of pot line electricity usage is an increasingly important issue for smelters because of country and continental electricity grids and variation in availability and price which connection to such grids can impose.

Generally, control of processes has evolved in different ways depending on the type of system under consideration. The desire to maintain a process and its operating conditions at the optimum operating parameters for which it was designed, or subsequently retrofitted for the purpose of increased production and minimal capital investment, is a common requirement since these parameters determine the quality of the product and the efficiency and cost of the process. In an attempt to maintain operation at such optimum parameters, control systems have involved some form of compensatory control loop or feedback loop in order to maintain steady operating conditions for the industrial plant.

Thus, using a smelting operation as an example once again, a normal control strategy has fixed or specified operating targets for the key process variables associated with the smelting operation. These key variables are adjusted in a compensatory fashion using other control inputs. A problem with this approach is that this may produce greater variation over time and compound the initial causes of the variation. In fact, the initial causes of the variation may not be addressed at all due to the reliance on manipulation of control inputs not necessarily related to the cause, allowing the causes of the variation to remain embedded in the process and increase in number over time.

Further, in order to reduce complexity, assessment of the process condition in smelting cells has been characterised by a limited set of measurements performed, at different intervals, on each cell. The last data point for each routinely measured variable is usually the one used in assessment of cell state.

With the above arrangements, inadequate information is provided to enable comprehensive operational or automatic control of the smelting operation to be effected.

SUMMARY OF THE INVENTION

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

According to a first aspect of the invention, there is provided a system for controlling an industrial plant, the system comprising:

automatic control equipment comprising a plurality of measurement sensors for sensing predetermined variables associated with components of the industrial plant, the sensors generating measured data relating to operation of the components of the industrial plant;

a database containing operational data, including observational data, regarding the industrial plant; and a processor in communication with the automatic control equipment and the database for receiving the measured data from the sensors of the automatic control equipment and the operational data from the database, the processor manipulating the measured and the operational data to provide an evolving description of a process condition of each component over time, along with output information relating to operational control of the industrial plant and for updating the database.

The automatic control equipment may constitute a first system level, the processor and database constitute a second system level with the system including a third system level, being a management level. The management level may use the information output from the processor for effecting control of the industrial plant. The levels may be configured to achieve an improvement in a number of operating variables of the plant.

The system and method are intended particularly, but not necessarily exclusively, for use in an aluminium smelting operation. For ease of explanation, the invention will be described below with reference to this application. Those skilled in the art will, however, appreciate that the system and method are suitable for use in other applications. In particular, the method described here is generally applicable to any complex industrial process involving elements or sub-processes which interact in a non-linear and/or unpredictable way and in which the state of the industrial process has low observability for reasons of sensing or other difficulties, and low controllability because of the interactive nature of inputs and outputs and the varying and unpredictable time scales of their response to a control input.

A non-exhaustive list of industrial processes with the characteristics referred to above include: alumina refineries where a multiplicity of interacting caustic liquor circuits exist, each with a different dissolved sodium aluminate concentration and degree of super-saturation, and some streams with precipitating aluminium trihydroxide as well; steel plants where the iron ore thermal reduction step, iron to steel making furnaces and continuous casting processes are closely linked through steel temperature, composition and heat transfer from the transporting and holding vessels; steel or aluminium rolling and annealing/coating lines where coil gauge and width profiles are hard to measure a priori but have a profound effect on the heat transfer to the strip as it is annealed and the correct velocity of the strip through the annealing furnace for metallurgical quality.

In an aluminium smelting operation, the smelter contains a plurality of individual cells in which the smelting of aluminium oxide, or alumina, occurs. The cells of the smelting operation are arranged in lines, commonly referred to as pot lines. As indicated above, the system levels are provided to achieve improvements in a number of operational aspects of the smelting plant, more particularly, feed control to achieve good alumina dissolution; feed control to detect when good dissolution is not occurring and to correct this to inhibit periods of sludge accumulation; compositional control to maintain the mass of aluminium fluoride at an approximately constant level in a bath in each cell and to allow reduced compositional and temperature variation over time as alumina feed control and energy balance control are improved; energy balance control to maintain both sufficient superheat and actual bath temperature for alumina dissolution; energy balance control to inhibit periods of excessive superheat over time; statistical and causal analysis to continuously reduce variations across pot lines; and enterprise level management to assess actual pot line capabilities cell by cell to organise and prioritise improvement actions to improve smelter capability over time.

The system may be operable within a range for each variable, as determined by variability within the process, and may act to reduce variation within each variable and other key process variables through identifying abnormal or systemic, damaging patterns of variation which can be related to a single dominant cause.

The system may include a classifier module in communication with the processor for classifying variations of operating variables of the plant into one of a predetermined number of classes of variations. The classifier module may classify variations in a process variable into one of three classes being: common cause or natural variation, special cause variation or structural variation.

Common cause or natural variation may occur where no dominant cause is acting and a mix of causes results in a basically random pattern of variation. This class of variation may not be responded to automatically but may be the subject of process investigations if certain circumstances are present such as if the magnitude of the variation is still high or if there are safety implications.

Special cause variation may be one where a statistically significant, rarely encountered pattern of variation indicates that a dominant cause is influencing the process at any one time and that this cause is not part of the way the process is normally run. This class of variation may be signalled or alarmed by the automatic control equipment for investigation by operations staff. The operations staff may use the processor to determine the cause and, ideally, where possible, eliminate or correct the cause.

Structural variation may be one where non-random variation occurs often or routinely through the action of physical and chemical laws and the way the process is operated. Corrective automatic control actions may be possible if undesirable structural variations are detected by the sensors of the automatic control equipment. This may require identifying, or "finger printing", the structural variation and observing corresponding changes in process condition over time.

In assessing the cell state, the present system may be operable to take into account information about the total process condition including process variable trajectory over a preceding period of time. In addition, when the plant is an aluminium smelting plant, the automatic control equipment may include bath superheat sensors, bath resistivity sensors, sensors for monitoring and noting electrical current variation and characteristic frequencies, cell off-gas temperature and flow rate sensors, and other control inputs such as the number of alumina shots fed to the cells in different feeding modes, for example, underfeed or overfeed modes and the degree of reduction in cell electrical resistance which occurs when such feeding modes are executed.

The observational data may relate to the operational state of the individual cells, the operational state being formally monitored and integrated into individual cell process conditions and including:— anode condition including red carbon, airburnt anodes, red stubs, spikes, cracked anodes;
  bath condition including carbon dust, gap between bath and crust, bubble generation and location of evolution of the bubbles in the cell, bath level;
  metal level and the projected metal tap history;
  cover condition (remaining thickness and height on the anode connectors/stubs), crust damage, fume escape from superstructure;
  alumina and bath spillage on electrical conductors (rods, beams, bus bars);
  control action history over previous weeks including aluminium fluoride addition, alumina addition, extra voltage, excessive, unplanned anode beam movements, metals and bath transfers, etc;
  cathode condition including cathode voltage drop (CVD) history, collector bar current density, instability history, anode changing observations, anode effect frequency, etc;
  shell condition, including red plates, shell deformation and excessive heat rising to the catwalk from a certain shell location;
  hooding condition—gaps, damage, fitment, door and quarter shield sealing;
  bus bar and flexible damage, collector bars cut;
  lack of duct gas suction as observed through fume escape into the pot room;
  feeder operation, feeder chutes, feeder holes blocked, alumina not entering feeder holes;
  side wall ledge condition, silicon carbide mass loss, history of silicon level in metal;
  excessive liquid bath output from cells or from a pot room, indicating a change in heat balance causing melting of ledge, crust or dissolution of bottom sludge;
  iron level in metal which is an indicator of bath level and anode condition;
  trace elements in the metal which is indicative of trends in current efficiency over time;
  flame colour, including blue flames, lazy yellow flames (sludge), bright yellow (sodium) shooting flames which may indicate some anode to metal direct contact in a cell; and
  general housekeeping around each cell.

Each operational state may be monitored automatically by the sensors, using regular cell observations or both by the sensors and by observation, information obtained from the monitoring process being integrated with state variable measurements to build a description of the cell process condition of each individual cell and its evolution over time. It will be appreciated that in any industrial process there will be a set of equivalent observational data representative of the operational state of the process.

The processor and the database may be operable to check the process condition for each cell individually with the database being updated periodically. For example, the cell process condition may be updated at the commencement or termination of each shift.

The processor may include a causal framework for relating identified problems and cell process conditions to specific causes. The causal framework may form part of a learning algorithm of the processor which is improved and updated over time using data from the database, including feedback from staff about the validity of the causes identified and the effectiveness of corrective actions applied. This may also include conflicts which are observed and documented between the observational data and decisions and the numerical state information and automated decisions at level 1 of the control system. These updates may be subject to monthly review by management before becoming part of the knowledge base in the control system. Thus, the management level may employ causal trees containing the learning algorithm to provide a growing framework of decision support and, in the case of a smelting operation, cell diagnosis over time.

The database may have information associated with each cell and may contain process variable identifiers or "fingerprints" associated with specific problems, process events and/or cell process conditions.

The processor may further use a complexity measure to assess predictability of the process outcomes and the overall operation of the plant.

According to a second aspect of the invention, there is provided a method of controlling an industrial plant, the method comprising:

monitoring operation of the industrial plant by a plurality of sensors forming part of automatic control equipment;

transferring measured data from the sensors and observational (qualitative) data relating to operation of the industrial plant to a processor;

accessing a database containing operational data including data from the sensors and the observational data relating to operation of the industrial plant, as periodically updated by the processor; and generating evolving process condition descriptions of each monitored component of the industrial plant and output information relating to operation of the industrial plant.

Thus, the method may include employing new formal control objectives based on the long term reduction in variability of the process, and on integrating human observation and decision making into the computational organisation of sensed information in traditional control systems.

The method may include forming three system levels, the automatic control equipment constituting a first system level, the processor and database constituting a second system level and a third system level being a management level. The method may include using the information output from the processor in the management level for effecting control of the industrial plant. The method may include configuring the levels to achieve an improvement in a number of operating variables of the plant.

The plant may be an aluminium smelting plant and the method may include configuring the levels to achieve improvements in a number of operational aspects of the plant. These operational aspects are generally not considered as part of the process condition of the industrial plant from a control viewpoint. More particularly, the operational aspects may include feed control to achieve desired alumina dissolution; feed control to reduce, and, if possible, eliminate, periods of sludge accumulation; compositional control to maintain the mass of aluminium fluoride at an approximately constant level in a bath in each cell and reduce compositional and temperature variation over time; energy balance control to maintain both sufficient superheat and actual bath temperature for alumina dissolution; energy balance control to inhibit periods of excessive superheat over time; statistical and causal analysis to continuously reduce variations across pot lines; and enterprise level management to assess actual pot line capabilities cell by cell to organise and prioritise improvement actions to improve capability over time and to optimise the production of metals with specifications matching sales orders.

The method may include operating the plant within a range for each variable as determined by variability within the process and which acts to reduce variation within each variable and other key process variables through identifying abnormal or systemic, damaging patterns of variation which can be related to a single dominant cause. Thus, the method may include correcting or minimising identified causes as appropriate, reducing the range of each process variable and improving process capability over time.

The method may include classifying variations of operating variables of the plant into one of a predetermined number of classes of variations. In particular, the method may include classifying variations in a process variable into one of three classes being: common cause or natural variation, special cause variation or structural variation.

The method may include taking into account information about the total process condition including process variable trajectory over a preceding period of time. The observational data may relate to the operational state of the individual cells, the method including formally monitoring and integrating the operational state into individual cell process conditions and the operational states including:— anode condition including red carbon, airburnt anodes, red stubs, spikes, cracked anodes;

bath condition including carbon dust, gap between bath and crust, bubble generation and location of evolution of the bubbles in the cell, bath level;

metal level and the projected metal tap history;

cover condition (remaining thickness and height on the anode connectors/stubs), crust damage, fume escape from superstructure;

alumina and bath spillage on electrical conductors (rods, beams, bus bars);

control action history over previous weeks including aluminium fluoride addition, alumina addition, extra voltage, excessive, unplanned anode beam movements, metals and bath transfers, etc;

cathode condition including cathode voltage drop (CVD) history, collector bar current density, instability history, anode changing observations, anode effect frequency, etc;

shell condition, including red plates, shell deformation and excessive heat rising to the catwalk from a certain shell location;

hooding condition—gaps, damage, fitment, door and quarter shield sealing;

bus bar and flexible damage, collector bars cut;

lack of duct gas suction as observed through fume escape into the pot room;

feeder operation, feeder chutes, feeder holes blocked, alumina not entering feeder holes;

side wall ledge condition, silicon carbide mass loss, history of silicon level in metal;

excessive liquid bath output from cells or from a pot room, indicating a change in heat balance causing melting of ledge, crust or dissolution of bottom sludge;

iron level in metal which is an indicator of bath level and anode condition;

trace elements in the metal which is indicative of trends in current efficiency over time;

flame colour, including blue flames, lazy yellow flames (sludge), bright yellow (sodium) shooting flames which may indicate some anode to metal direct contact in a cell; and general housekeeping around each cell.

The method may further include monitoring each operational state automatically by the sensors, using regular cell observations or both by the sensors and by observation, information obtained from the monitoring process being integrated with state variable measurements to build a description of the cell process condition of each individual cell and its evolution over time.

The method may includes operating the processor and the database to check the process condition for each cell individually and updating the database periodically. For example, the cell process condition may be updated at the commencement or termination of each shift.

In addition, the method may include using a causal framework to relate identified problems and cell process conditions to specific causes. The method may include integrating the causal framework into a learning algorithm of the processor which is improved and updated over time using data from the database. Thus, the method may include employing causal trees containing the learning algorithm to provide a growing framework of decision support and, in the case of a smelting operation, cell diagnosis over time.

The database may have information associated with each cell and may contain process variable identifiers or "fingerprints" associated with specific problems, process events and/or cell process conditions.

The method may include using a complexity measure to assess predictability of the process outcomes and the overall operation of the plant.

According to a third aspect of the invention, there is provided a system for controlling an industrial plant, the system comprising:

automatic control equipment comprising a plurality of measurement sensors for sensing predetermined variables associated with components of the industrial plant;

a database containing operational data, including observational data, regarding the industrial plant; and a processor in communication with the automatic control equipment and the database for receiving data from the sensors of the automatic control equipment and from the database, the processor using causal tree analysis comprising at least one continually updated learning algorithm to provide a framework of decision support and plant component diagnosis over time.

According to a fourth aspect of the invention, there is provided a method of controlling an industrial plant, the method comprising:

monitoring operation of the industrial plant by a plurality of sensors forming part of automatic control equipment;

transferring data from the sensors and observational data relating to operation of the industrial plant to a processor;

accessing a database containing operational data, including the data from the sensors and the observational data relating to operation of the industrial plant, as periodically updated by the processor; and using causal tree analysis comprising at least one continually updated learning algorithm to provide a framework of decision support and plant component diagnosis over time.

According to a fifth aspect of the invention, there is provided automatic control equipment for a system for controlling an industrial plant, the system comprising:

a plurality of measurement sensors for sensing predetermined variables associated with components of the industrial plant;

a signal processing module responsive to the sensors and control input data; and a classifier module in communication with the signal processing module for classifying variations of operating variables of the plant, as detected by the sensors, into one of a predetermined number of classes of variations.

According to a sixth aspect of the invention, there is provided a method of operating an industrial plant, the method comprising:

monitoring operation of the industrial plant by a plurality of sensors;

processing data from the sensors and other control inputs; and classifying variations of operating variables of the plant, as detected by the sensors, into one of a predetermined number of classes of variations.

According to a seventh aspect of the invention, there is provided a method of operating an industrial plant, the method comprising monitoring operation of the industrial plant by a plurality of sensors forming part of automatic control equipment;

transferring measured data from the sensors and observational data relating to operation of the industrial plant to a processor;

accessing a database containing operational data, including the data from the sensors and the observational data relating to operation of the industrial plant, as periodically updated by the processor, to provide mechanisms to assist in identification and removal of causes of variations in the measured data; and combining automatic control as carried out by the automatic control equipment with said mechanisms to provide continuous improvement in the operation of the plant.

According to an eighth aspect of the invention, there is provided a system for controlling an industrial plant, the system comprising:

automatic control equipment comprising a plurality of measurement sensors for sensing predetermined variables associated with components of the industrial plant;

a database containing operational data, including observational data, regarding the industrial plant; and a processor in communication with the automatic control equipment and the database for receiving data from the sensors of the automatic control equipment and from the database, the processor using a complexity measure to assess predictability of the plant.

The use of the complexity measure may provide an early warning of a trend to more chaotic or less reliable operation of the plant (and/or the people in the plant) over time which will not otherwise be detected by the more repetitive, regular operation of control inputs and process outputs.

According to a ninth aspect of the invention, there is provided a method of controlling an industrial plant, the method comprising:

monitoring operation of the industrial plant by a plurality of sensors forming part of automatic control equipment;

feeding data from the sensors and observational data relating to operation of the industrial plant to a processor;

accessing a database containing operational data, including the data from the sensors and the observational data relating to operation of the industrial plant, as periodically updated by the processor; and using a complexity measure to assess predictability of the plant.

The complexity measure may further alarm deteriorating trends in the reliability of the plant or elements of it (for example a particular part of a potline or a whole potline may start to behave less reliably than others in the same smelter).

BRIEF DESCRIPTION OF THE DRAWINGS

Embodiments of the invention are now described by way of example only with reference to the accompanying drawings in which.

DETAILED DESCRIPTION OF EXEMPLARY EMBODIMENTS

Figure 1:
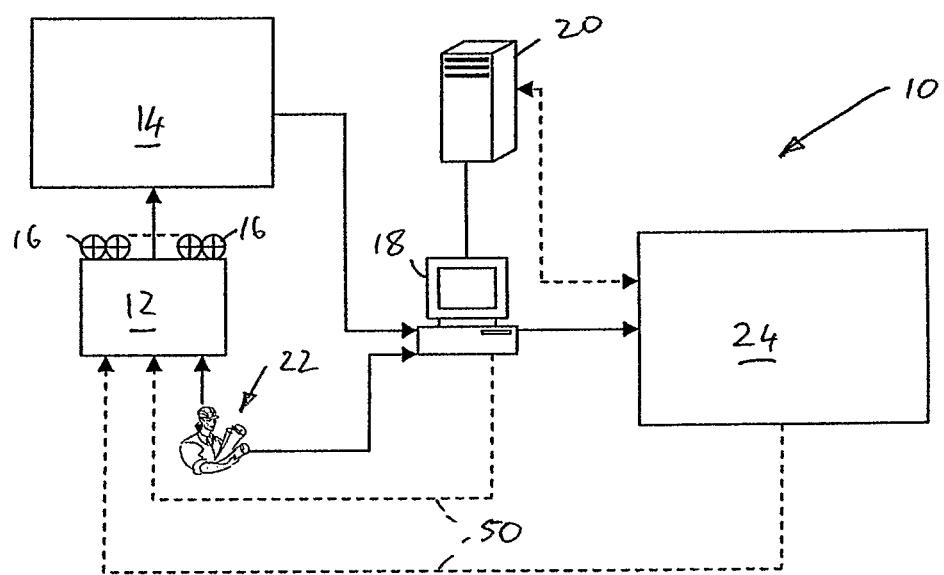
FIG. 1 shows a schematic block diagram of a system, in accordance with an embodiment of the invention, for controlling an industrial plant.

In FIG. 1 of the drawings reference numeral 10 generally designates a system, in accordance with an embodiment of the invention, for controlling an industrial plant. The plant is designated generally by the reference numeral 12. The system 10 will be described with reference to its application to an aluminium smelting operation but it will be appreciated that the system 10 could be used in any industrial plant requiring control. The smelting operation or smelter 12 comprises a plurality of pot lines. Each pot line is constituted by a plurality of cells in which alumina is processed to form aluminium. Aluminium formed in the cells is tapped off periodically for casting or further processing downstream in the plant 12.

The purpose of the system 10 is to minimize energy consumption and smelter emissions, maximize productivity and metal purity and promote a safer, healthier working environment over time by continuously reducing and removing variations in the process. The control objectives of the system 10 include:—

1. Feed control to achieve conditions for good alumina dissolution for a high proportion of the operating time through identifying early signs of poor dissolution conditions and acting automatically if heat or composition related or through operational decisions and intervention if not able to be corrected automatically.

2. Feed control to inhibit periods of sludge accumulation which are usually characterised by low alumina input during an underfeeding control mode and high alumina input during an overfeeding control mode and through this objective and objective 1 above jointly to minimize anode effects on all of the cells.

3. Compositional control which maintains the mass of aluminium fluoride at an approximately constant level in the whole cell but also provides signals and mechanisms to correct the causes of aluminium fluoride mass variation within cells and pot lines, thereby improving the stability of aluminium fluoride concentration in the bath over time.

4. Energy balance control which maintains both sufficient superheat and actual bath temperature for alumina dissolution and which inhibits large scale electrolyte freezing during normal cell operations such as anode setting, alumina feeding, metal level changes, or other additions to the cell.

5. Energy balance control which minimises periods of excessive superheat over time by signalling when causes of excessive superheat are present and by giving decision support to cause identification and elimination.

6. Continuous reduction in variation across the pot lines by categorising and finger printing sensor responses, integrating operational information with cell data histories and connecting the resulting cell process condition and identified process signals to proven causal trees. These causal trees contain a learning algorithm (as discussed below) and provide a growing framework of decision support and cell diagnosis over months and years of operation of the industrial process.

7. Enterprise level management which assesses actual pot line capability cell by cell and includes carbon plant and casthouse capabilities to organise and prioritise improvement actions over time. The system builds levels of planning information for future years based on cell and pot line constraints and tested solutions to result in maximized production, capture of higher purity metal and satisfying sales order metal specifications (through bath level, anode airburn and bath temperature variability reduction and linkage to the casthouse metal batch and furnace capture). It also matches anode capability and cell capability across their respective populations to reduce anode/cell adverse interactions over time.

The above objectives are achieved through a three step control model of, firstly, observing the process, secondly, understanding the variation and, thirdly, controlling the outcome. Particular emphasis is placed on the multivariate nature and non-linearity of the system 10. The system 10 is implemented within an architecture which systemizes observation of total process condition in the first control step, learning through a causal framework associated with the second control step and a human decision guidance module associated with the third control step.

The system 10 includes automatic control equipment 14. The automatic control equipment 14 comprises a plurality of sensors 16 for monitoring operating variables associated with the smelter 12. The automatic control equipment 14 and the sensors 16 constitute a first level of the system 10.

A second level of the system 10 comprises a processor 18 which communicates with the automatic control equipment 14. The processor 18 is further in communication with a database 20 in which operational data relating to the cells of the smelter 12 are stored. In addition to the sensor and routine numerical measurements, the database 20 contains data relating to problems and process variable identifiers or "fingerprints" associated with specific problems or events related to each cell of the smelter 12. These data are derived from the sensors 16 as well as qualitative observational data as detected by operations staff, as illustrated schematically at 22, which is input into the database via the processor 18.

A third level of the system 10 is a management level 24 which uses data from the database 20 to control and improve operation of the smelter 12, as will be described in greater detail below.

Figure 2:
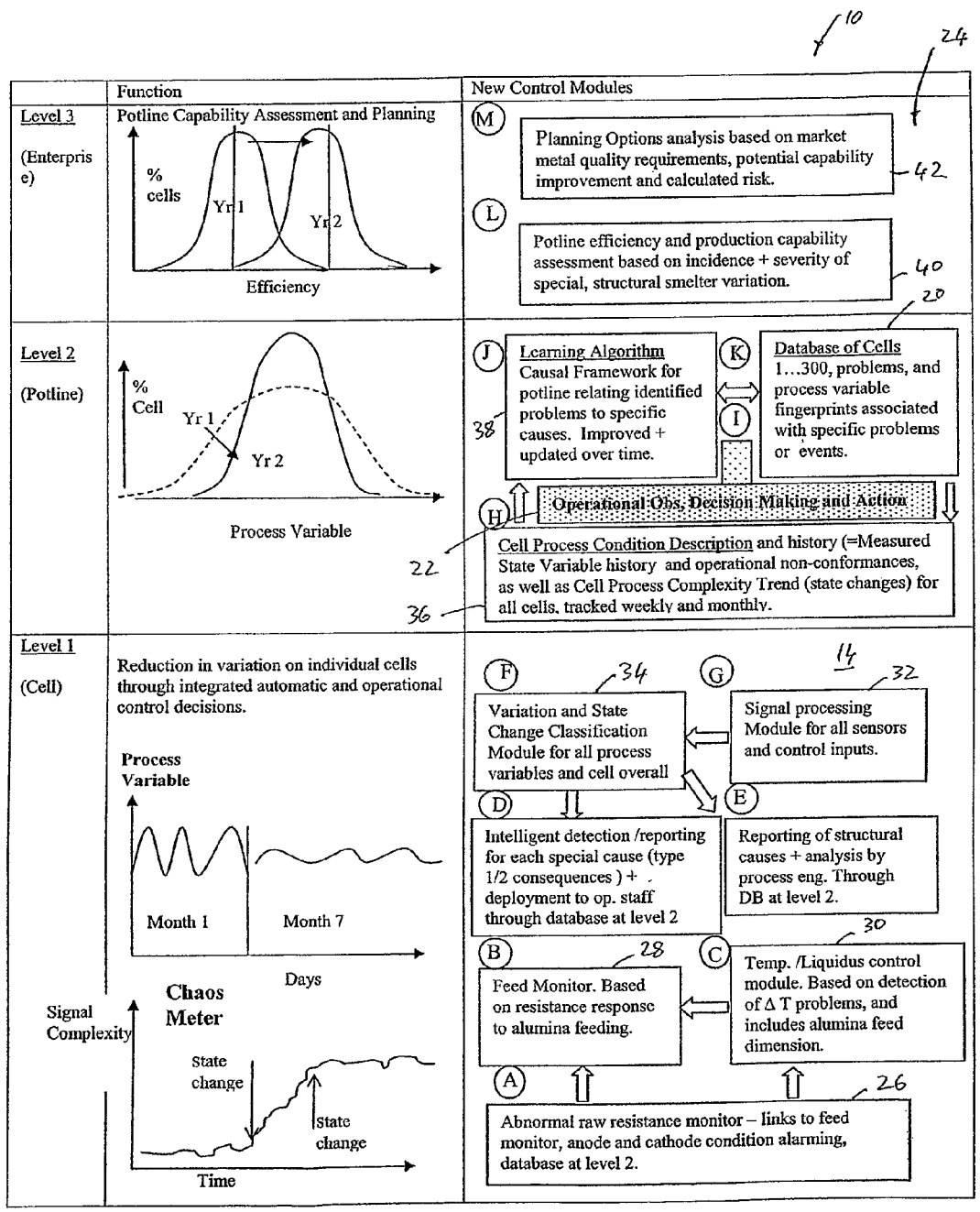
FIG. 2 shows a tabular representation of the system of FIG. 1.

A tabular arrangement of the system 10 is shown in FIG. 2 of the drawings. The automatic control equipment 14, as indicated above, communicates with the sensors 16. These sensors 16, in turn, feed to a plurality of monitoring modules. Hence, the automatic control equipment 14 comprises an abnormal raw resistance monitor 26 for monitoring a rapidly acquired cell resistance signal and detecting patterns and frequencies indicative of abnormal operation. Together with alarming of cathode and anode abnormalities, the resistance monitor 26 is used in combination with a feed monitor module 28 which monitors the response of the individual cell resistances of the smelter 12 to the feeding of alumina at different rates corresponding to the different feed control modes.

A temperature/liquidus control module 30 also communicates with the feed monitor module 28 and with the raw resistance monitor 26. This module 30 monitors changes in temperature, liquidus temperature and bath resistance per millimeter of anode beam movement (if these sensors are active) and also includes an alumina concentration dimension computed with reference to the feed monitor module 28.

The automatic control equipment 14 further includes a signal processing module 32 which receives signals from all of the sensors 16 and other control inputs. It summarises the essential character (mean, range, trend, frequency) of these signals and controls the supply of the resulting information to the processor 18 of the system 10.

The operating variables of the smelter 12 are classified in three classes, as will be described in greater detail below. To enable this to occur, the automatic control equipment 14 includes a classifier module 34. This classifier module 34 classifies variations into one of the three classes. In addition, the classifier module 34 classifies the cells of the pot line.

In level two of the system 10, the processor 18 includes a cell process condition module 36 which communicates with the database 20 for maintaining a history of state variables, operational observations and non-conformances of both as well as cell process complexity trends (which can show process state changes) for all cells. The cell process condition is tracked daily, weekly and monthly. Short and longer term aspects of the cell process condition are determined and updated periodically, for example, at the commencement or termination of each shift, weekly and/or monthly.

The cell process complexity trends are used to determine aspects of the cell state which are not evident from the normal physical measurements of process variables. Predictability of the system 10 is assessed using a complexity/information measure referred to as T-entropy. Briefly, T-entropy is an algorithmic technique which allows computation of the complexity of a finite string of characters which are produced by symbolically transforming information from visual and other analogue or digital signals. (A complete treatment of the derivation of T-entropy can be obtained from the following reference: Titchener, M. R., Gulliver, A., Nicolescu, R., Speidel, U. and Staiger, L. (2005) *Deterministic Complexity and Entropy*. Fundamenta Informaticae, 64(1-4), 443-61.)

T-entropy is analogous to its thermodynamic equivalent which is most commonly referred to as the 'level of disorder' in a (chemical) system. Similarly, T-entropy evaluates the level of disorder in a finite, two-dimensional signal. T-entropy contains information which is not provided in traditional signal processing, where the repetitive, regular frequency characteristics of a signal are determined. The non-repetitive, chaotic or non-linear elements of signals in real world problems contain more information however. It is this complex, real world behaviour which is transduced through the T-entropy computation.

Figure 3:
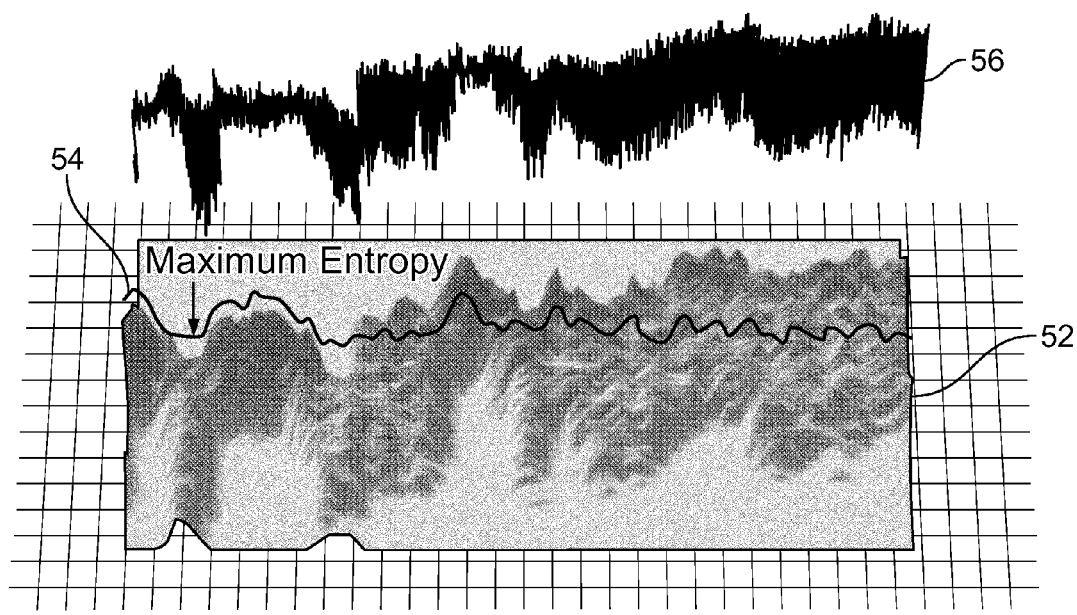
FIGS. 3-6 show a graphic representation of an example of the determination of state changes for a cell using a complexity measure.

Using the example of a pseudo-resistance trace from a pre-bake operating cell with metal pad noise developing over a period of four hours, FIG. 3 exemplifies the computation of T-entropy. In FIG. 3, an entropy surface 52 and its maximum entropy 54 for pseudo-resistance trace 56 is illustrated.

Figure 4:
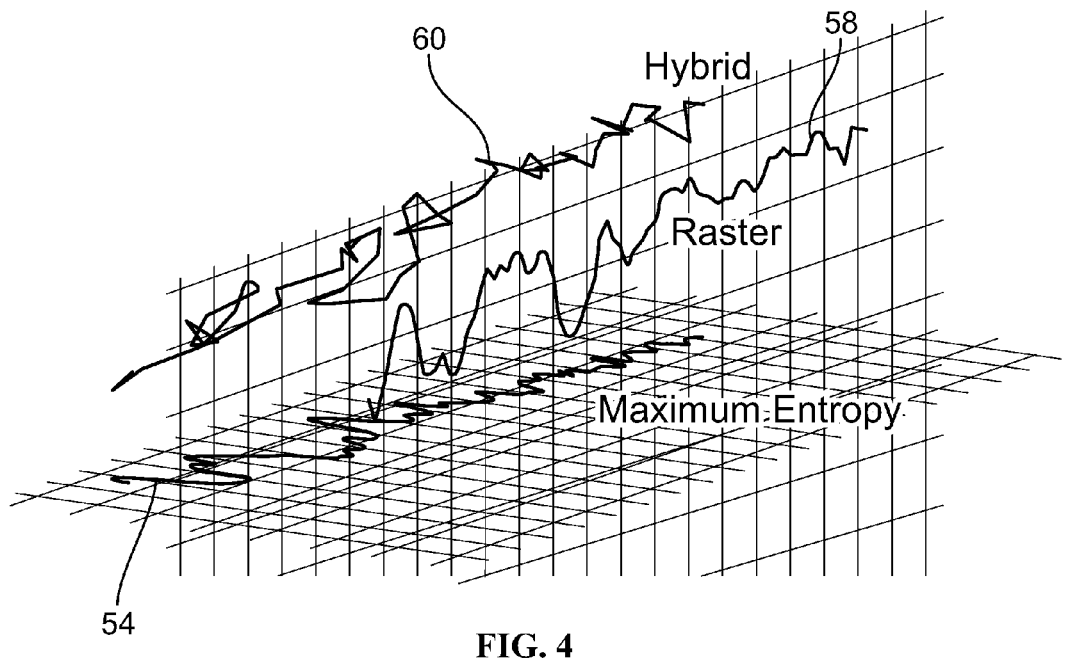
Figure 5:
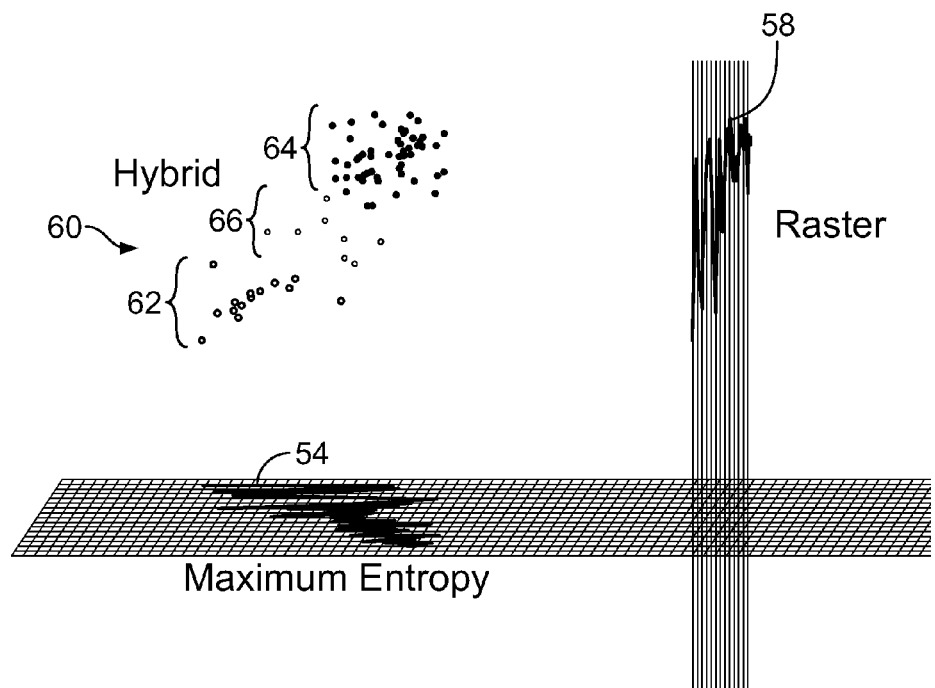

In FIG. 4, the maximum entropy 54, an integral under the curve, or raster, 58 and a three-dimensional hybrid trace 60 are illustrated. Another "view" of this (in a z-y plane) is shown in FIG. 5 of the drawings. This shows areas of density in the hybrid trace 60. The two areas of density are shown at 62 and 64 with the transition between them shown at 66. The three clusters 62-66 indicate three distinct states of the process with state changes associated with physical changes inside the cell which it is not possible to detect routinely by other sensors and methods.

Figure 6:
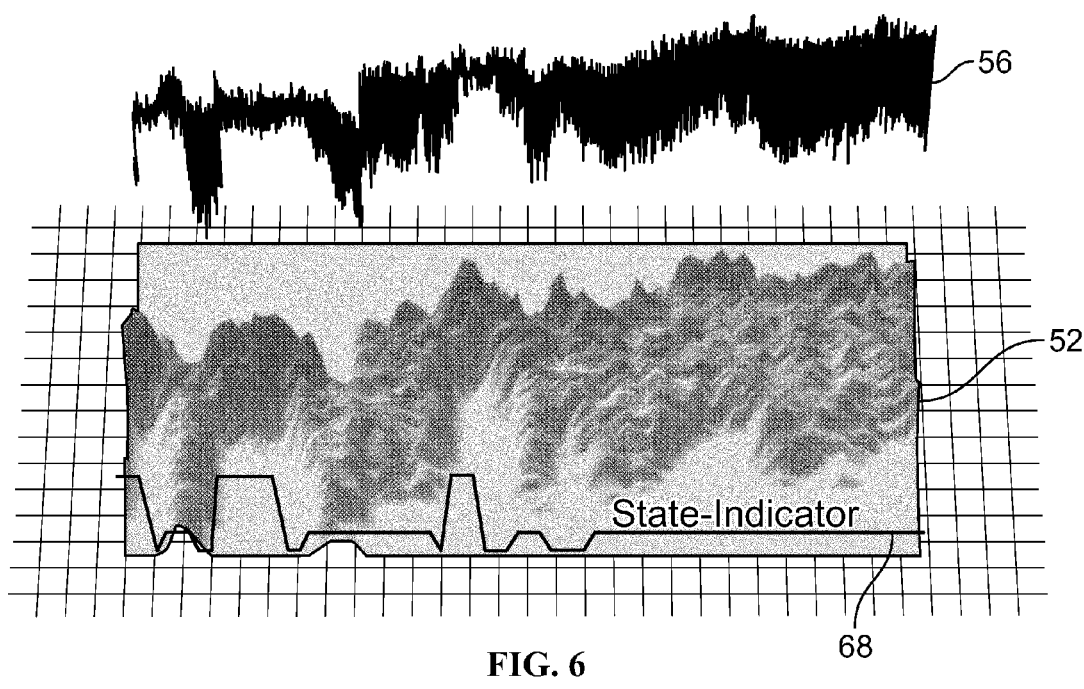

The three clusters or states 62-66 identified in FIG. 5 are plotted against time as a trace 68 together with the T-entropy output 52 and the pseudo-resistance output 56 as shown in FIG. 6. This state information 68 would not have been obtainable from the pseudo-resistance trace 56 alone and provides information concerning changes in the complexity of the cell behaviour. The information provided by the trace 68 is integrated into the cell process condition module 36 and is made available to the operational staff of the plant to enable analysis and remedial action, if necessary, to be undertaken.

The processor 18 makes use of a learning algorithm 38 for causal tree analysis. The learning algorithm comprises a causal framework 39 (FIG. 11) for the pot line of the smelter 12 and relates identified problems and cell process conditions to specific causes. The processor 18 therefore communicates with the database 20 and under management authorisation the new causal/cell condition links and corrective actions are added to the framework so that the causal framework is improved and updated over time to render the learning algorithm 38 more applicable to prevailing circumstances. Operational staff at the plant provide feedback concerning the success of causal analysis and recommendations into the processor 18 to integrate the practical aspect of plant operation and to improve future control system actions.

The management level 24 includes an assessment module 40. The assessment module 40 assesses pot line efficiency and production capability on a cell by cell basis, taking note of the incidence and severity of variations occurring in two of the classes, i.e. special cause variation and structural cause variation.

Additionally, the management level 24 comprises an analysis module 42 for effecting planning options analysis based on potential capability improvement and calculated risk over a period of time.

As indicated above, the classification module 34 classifies variations in each variable into one of three classes. These three classes are:— common cause or natural variation, special cause variation and structural cause variation.

Common cause or natural variation is a variation where no dominant cause is acting and the mix of causes results in a basically random pattern of variation. This class of variation is not responded to automatically but may be the subject of process investigations if the magnitude of the variation is too high or has safety implications.

Special cause variation is one where a statistically significant, rarely encountered pattern of variation indicates that a dominant cause is influencing the process at that particular time and that this cause is not part of the way the process is normally run. This class of variation is detected by the sensors 16 of the automatic control equipment 14 and/or through the systematic observations of staff at the cells during routine daily operations and is investigated by the operations staff 22. The staff 22 use the causal tree analysis of the processor 18 to determine and, if possible, eliminate the cause.

Structural variation occurs where non-random variation takes place often or routinely through the action of physical and chemical laws and the way the process is operated. Automatic corrective action is possible if undesirable structural variation is detected in the cell sensors 16. This requires access to the database to determine established connections between the cell sensor responses, causes of variation and control objectives of the system 10. This is achieved through finger printing the structural variations and observing corresponding changes in the process condition over time.

Insofar as the first step of observing the process is concerned, the control strategy of the system 10 does not rely solely on fixed or specified operating targets for the key process variables such as bath temperature, bath composition, and cell voltage. Rather, the control strategy operates over a range of process variables determined by variability within the process itself to produce a target cell process condition related to the desired process outcomes (for example energy efficiency, metal purity, anode effects, cell life, cost of production and safety). The control strategy acts to reduce variation in the range of these key process variables through identifying abnormal or systemic, damaging patterns of variations which can be related to a single dominant cause at a given point in time. The identified causes can then be corrected or eliminated as appropriate reducing the range of each process variable and improving the process capability over time. Thus, the system uses, in addition to the existing cell sensors 16, new cell sensors such as bath superheat sensors, bath resistivity sensors, sensors for monitoring anode current variation at characteristic frequencies, cell off-gas temperature and flow rate sensors and other control inputs.

In addition, observational data as detected by the operation staff 22 include monitoring the operational state of the cells by monitoring of the following:
  anode condition including red carbon, airburnt anodes, red stubs, spikes, cracked anodes;
  bath condition including carbon dust, gap between bath and crust, bubble generation and location of evolution of the bubbles in the cell, bath level;
  metal level and the projected metal tap history;
  cover condition (remaining thickness and height on the anode connectors/stubs), crust damage, fume escape from superstructure;
  alumina and bath spillage on electrical conductors (rods, beams, bus bars);
  control action history over previous weeks including aluminium fluoride addition, alumina addition, extra voltage, excessive, unplanned anode beam movements, metals and bath transfers, etc;
  cathode condition including cathode voltage drop (CVD) history, collector bar current density, instability history, anode changing observations, anode effect frequency, etc;
  shell condition, including red plates, shell deformation and excessive heat rising to the catwalk from a certain shell location;
  hooding condition—gaps, damage, fitment, door and quarter shield sealing;
  bus bar and flexible damage, collector bars cut;
  lack of duct gas suction as observed through fume escape into the pot room;
  feeder operation, feeder chutes, feeder holes blocked, alumina not entering feeder holes;
  side wall ledge condition, silicon carbide mass loss, history of silicon level in metal;
  excessive liquid bath output from cells or from a pot room, indicating a change in heat balance causing melting of ledge, crust or dissolution of bottom sludge;
  iron level in metal which is an indicator of bath level and anode condition;
  trace elements in the metal which is indicative of trends in current efficiency over time;
  flame colour, including blue flames, lazy yellow flames (sludge), bright yellow (sodium) shooting flames which may indicate some anode to metal direct contact in a cell; and
  general housekeeping around each cell.

The cell process condition elements monitored above can be monitored either by the operations staff 22 or by the sensors 16. This information is integrated with state variable measurements to build a description of the total process condition of each individual cell and its evolution over time.

The cell process condition for each cell is tracked individually by the processor 18 and is updated periodically, for example, at the commencement or termination of each shift. The process condition description is also used in the automatic control equipment 14 and may be used for operational decisions during any shift for individual cells or for the pot line. The process condition is also used for process engineering investigations to correct individual cells manifesting long term problems and, finally, is used by the management level 24 which uses pot line condition for judging the capability of the smelter 12 to alter its operating settings, for example, production rate or energy usage.

As indicated above, understanding the variation in the operating variables comprises classifying these variations in one of the three classes.

The third step of the control system 10 is achieved by altering the traditional function of each level of the system 10 so that the new control objectives set out above are met. Insofar as the first level is concerned, the control system 10 seeks to achieve a systematic reduction in individual cell variations through corrective control of variables such as alumina feed, bath composition and energy input and relies on the integration of operator observations of cell condition and their subsequent well informed decisions and actions to remove causes of these variations.

The second level of the system 10 seeks to achieve pot line variation reduction through removal of causes of the variations. It further relies on pot line management which emphasises decision making using the database framework of variation and causes which is continually updated with evidence accumulating over time and is systematically linked to the operational observations and practical decision making so that contradictions between theoretical control decisions and direct observation are constantly being sought and resolved. It also facilitates individual cell process condition description and tracking using T-entropy trends to identify hidden state and state change information. This level also uses human decision guidance linking physical cell condition stimuli to detection and decision making.

The management level 24 of the system 10 is used to effect pot line capability assessment based on cell state, metal purity distribution data from the second level and quantified improvement potential. The cell distribution data is linked to improvement strategies such as reducing poorly performing cells or moving the entire cell distribution, as well as metal marketing and financial planning and control.

Figure 7:
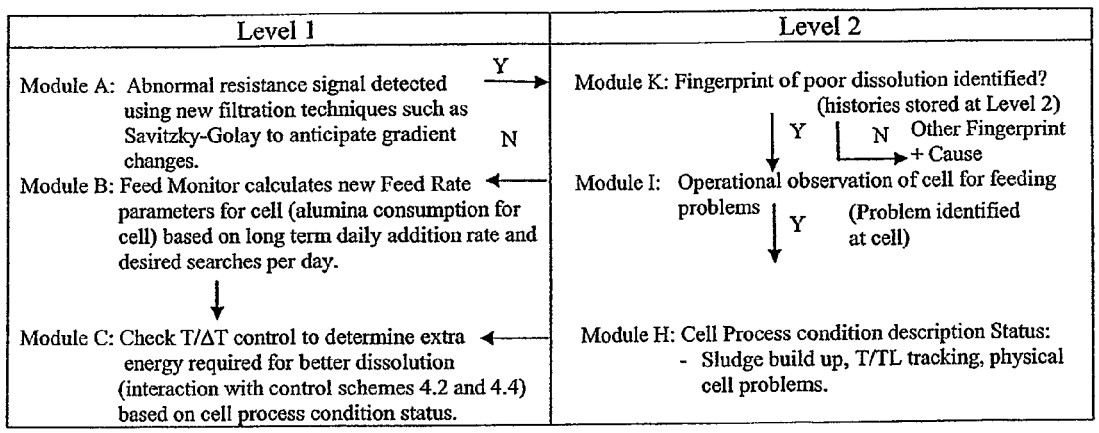
FIG. 7 shows a tabular representation of a first control objective of the system.

FIG. 7 shows a tabular implementation of the first control objective for achieving good alumina dissolution. The module letters correspond to the module labels in FIG. 2 of the drawings.

Figure 8:
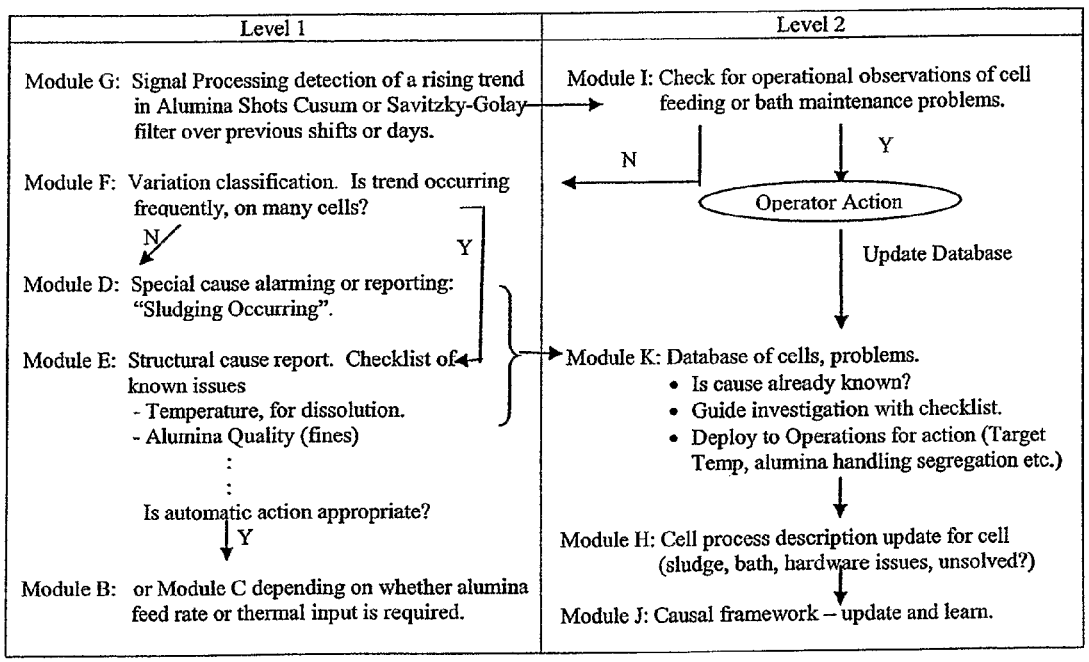
FIG. 8 shows a tabular representation of a second control objective of the system.

Similarly, FIG. 8 shows a tabular representation of the second control objective of elimination of periods of sludge accumulation without incurring anode effects. As is the case with the first control objective, the second control objective relies on operational observations triggered automatically by sensing and level 1 control logic to indicate specific observations (concerning the alumina feeders primarily) required to achieve the control objectives.

Figure 9:
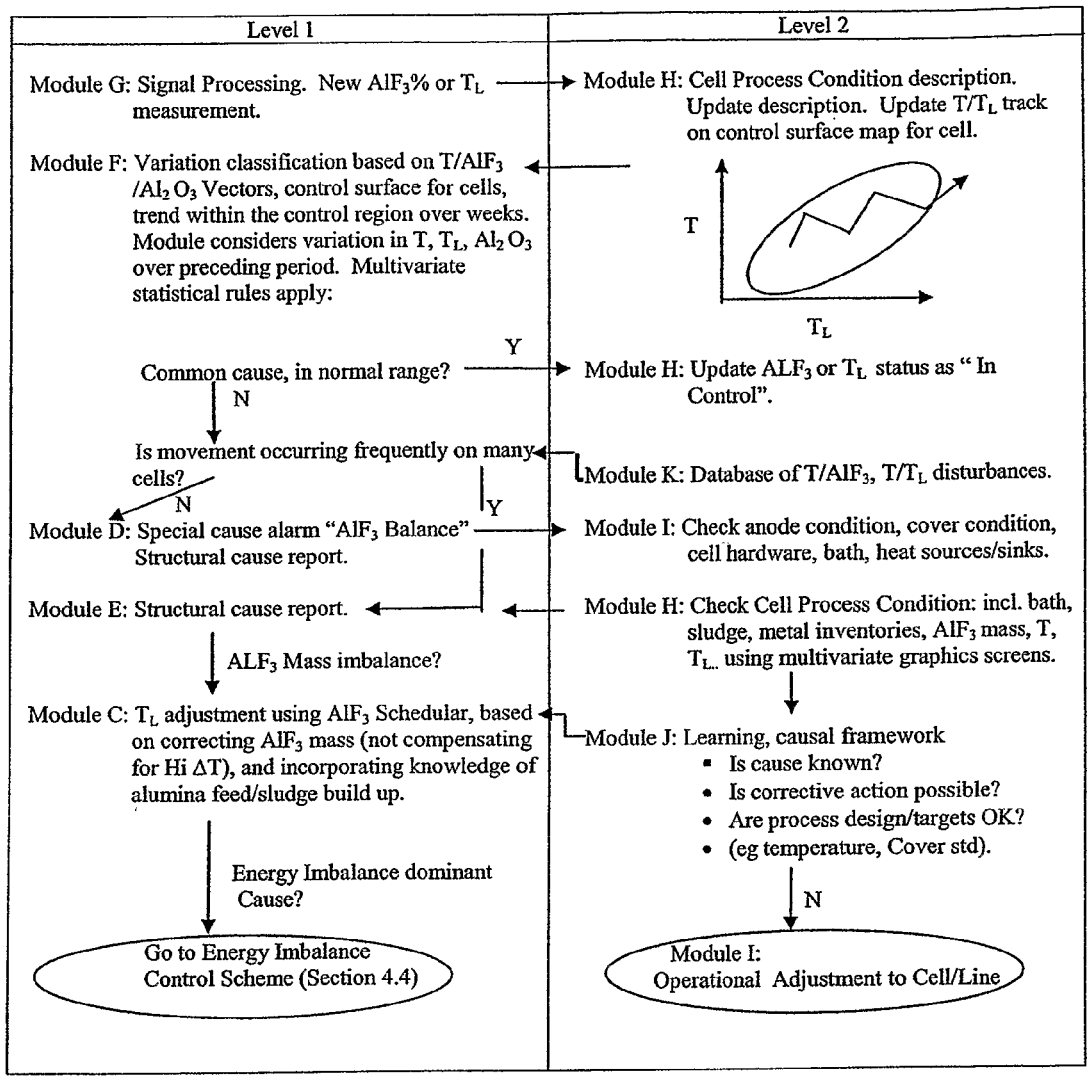
FIG. 9 shows a tabular representation of a third control objective of the system.

FIG. 9 shows a tabular representation of the third control objective of compositional control based on achieving near constant mass of aluminium fluoride in each cell and its improvement over time. In this control objective, there is, once again, a requirement for observational data and also operator input for adjustment of the cell or line, particularly in the case where the variation is identified as being special cause. The identification of adverse structural variation such as thermal and compositional cycling allows these to be related to the systemic causes embedded in the control system and the smelter 12 itself through the learning algorithm 38 at level 2 in the control system.

Figure 10:
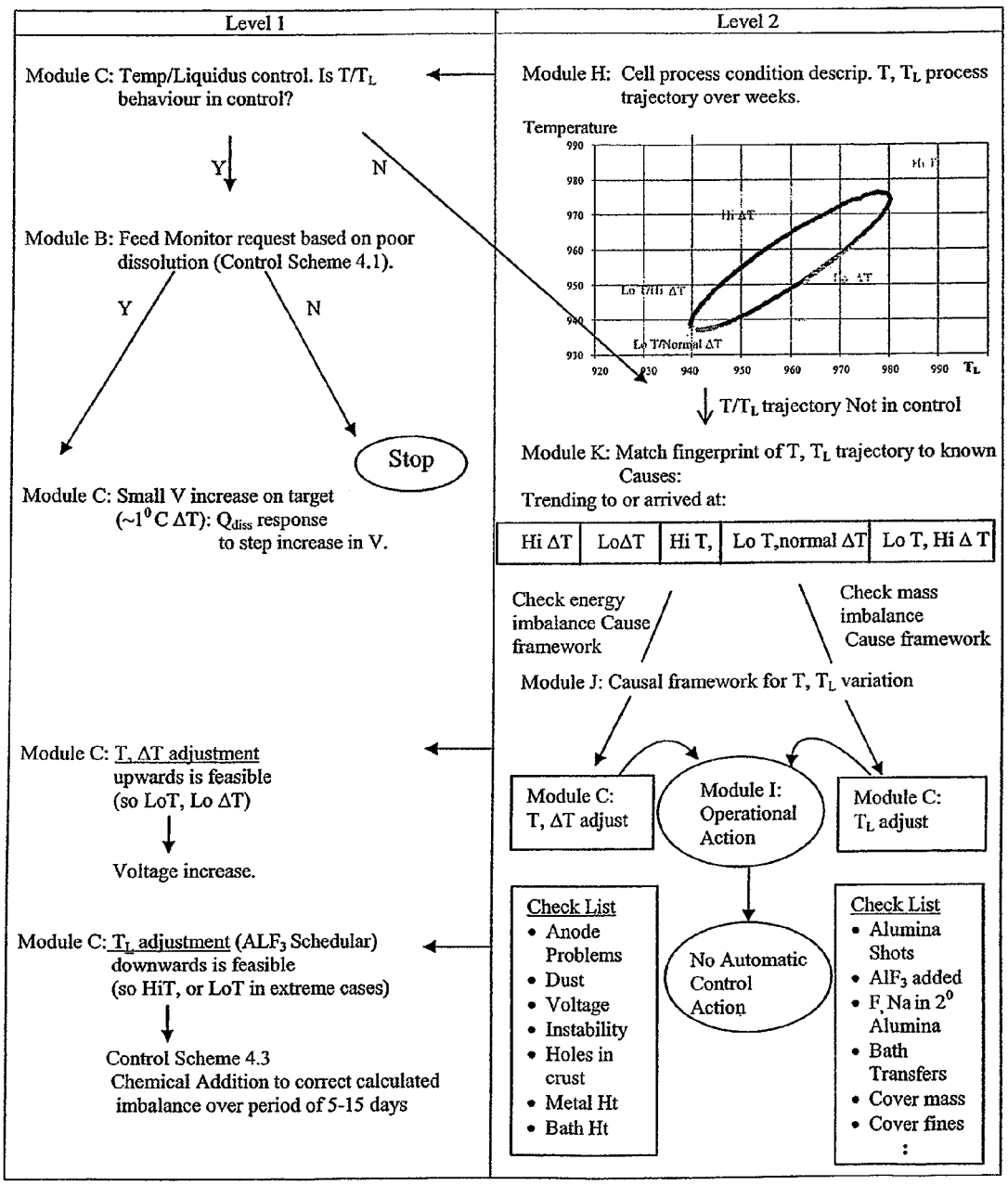
FIG. 10 shows a tabular representation of a fourth and a fifth control objective of the system.

FIG. 10 is a combination of control objectives 4 and 5 to achieve energy balance control to maintain changes in temperature within a range which can be withstood by the cell without damage to the process.

Figure 11:
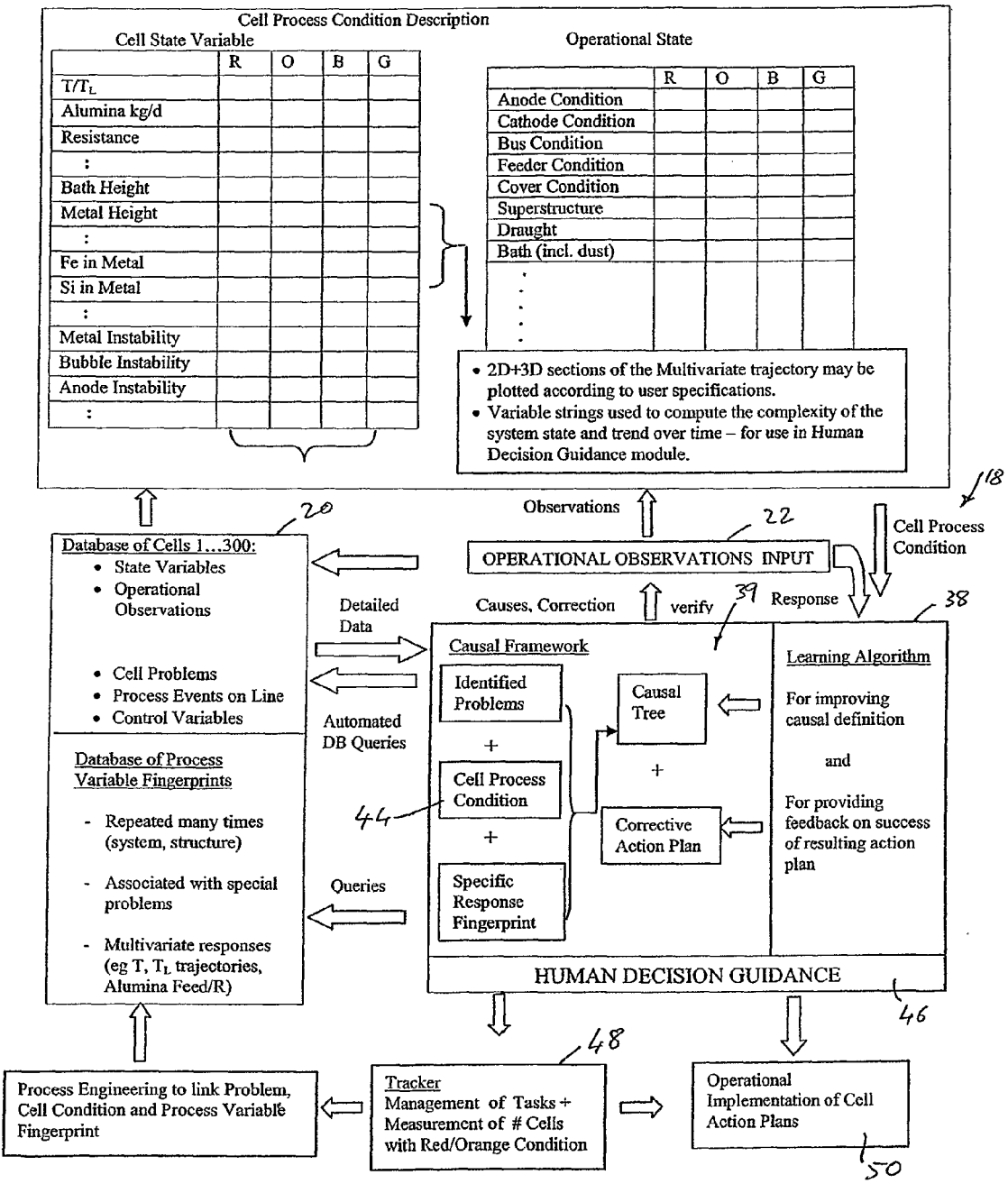
FIG. 11 shows a tabular representation of a sixth control objective of the system.

In the case of control objective 6, this control objective is met substantially at level 2 of the system 10 and is shown diagrammatically in FIG. 11. Because the system design is now specifically aimed at improvement and not only control, the architecture of the level 2 system differs from previous supervisory systems.

Better understanding of what constitutes the cell process condition now enables a single screen view of the state of each cell of the smelter 12 and incorporates both state variable measurement and operational state attributes as well as the respective histories. One embodiment of this view is shown in the first part of FIG. 11. Each variable or attribute is described by a colour being red (R), orange (O), blue (B), or green (G) representing not only the last observation but also the stability of the observations over a specified operating period and within the stable, multi-dimensional control volume for selected groups of variables. Red and orange status indicates abnormal status conditions requiring attention and potential abnormality respectively.

Taking the example of "Alumina kg/d" the stability of the uni-variate measurement will be judged by the statistical stability of the custom of the "Alumina Daily addition. The capability of the cell with respect to "Alumina Feeding" will be judged by the flatness of the Cusum Chart. In other words: "Is the cell consumption of alumina matched to the metal production rate?" However, this variable is also combined into multivariate views of the whole cell process condition because of its interaction with the thermal and compositional balance. In this example of alumina feeding, kg/d of alumina fed during an underfeed mode and kg/d of alumina fed during an overfeed mode can be analysed as a bi-variate surface, leading to a state descriptor for feeding, as one element of the overall cell process condition.

The database 20 contains the normal comprehensive numerical information over time, but with new classes of discontinuous, cell specific information as shown in FIG. 11. This "event driven" data is stored in time stamped flat files and is used along with process variable fingerprints stored in the database to establish likely causes within the causal framework 39.

The causal framework 39 is largely automated in its data queries and logic processing. It is designed to respond to management requirements in two ways by, firstly, providing causes and corrective actions for individual problems through request at any time. These requests can also be automated at a start of a shift through the cell process condition module 44, if required.

The causal framework 39, secondly, provides timed (daily, weekly, monthly) review reports to people within the organisation. These reports are configurable and summarise problems requested, those resolved and those with adverse consequences stemming from the advice provided, learning opportunities formulated (for authorisation) and conflicts between causal logic and observations (for resolution). This is provided on a human decision guidance module 46.

The causal framework 39 drives improvements in control and in performance on the pot line by use of the enhanced database 20 and process condition descriptions to solve single cell and systemic pot line problems.

The presentation of summary data on the number of problems outstanding on the number of cells in various states of control is a stimulus for management attention and is facilitated by having a continuous tracker 48 of both cell process condition and identified cell problems. The tracker 48 aids in operational implementation of cell action plans as shown at 50.

The tracker 48 plays an integral part of the management process embedded in level 2 of the system 10. Decisions are based on the scientifically formulated and evidentially confirmed causal framework 39, the diagnosed cell process condition and the computed trend in the complexity or chaotic nature of the cell condition using T-entropy.

The control objective 7 relies on achievement over time of the first six control objectives. It also requires that the measured and predicted future capability of the pot line is formally integrated into financial management and planning processes for the smelter 12. This is achieved by the modules 40 and 42 of the management level 24. The actual design of the modules 40 and 42 will depend on the enterprise level system which is in use at the smelter 12.

It is therefore an advantage of the invention that an improved system 10 is provided which enables more accurate control of a smelter 12 to be achieved over a period of time by the use of observational data, a causal framework 39 and automatic control equipment 14 which is more integrated with the formal control objectives and with the observations of the staff. With the new system, reduction in variation in individual cells through integrated automatic and operational control decisions can be achieved over a period of time resulting, in the long run, in improved operating efficiencies of the smelter 12.

A further advantage of the system 10 is that it achieves integration of energy, composition, alumina feed and operational controls with smelter improvement plans to minimise energy consumption and smelter emissions and to maximise production of metal of the highest possible purity/value over time. Still further, it facilitates a holistic assessment of the process condition of each individual cell, the process condition of each cell being maintained and updated over time.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. In particular, while the system and method have been described with reference to its application in an aluminium smelting plant, that has been done for ease of explanation only. The system and method are equally applicable in any industrial process where a set of equivalent observational data representative of the operational state of the process can be employed in improving the operation of the process.

The invention claimed is:

1. A system for controlling an industrial plant, the system comprising:
    automatic control equipment comprising a plurality of measurement sensors for sensing predetermined variables associated with at least one component of the industrial plant, the sensors generating measured data relating to operation of the at least one component of the industrial plant;
    a database containing the measured data and observational data obtained by plant personnel and relating to an operational state of the at least one component of the industrial plant; and
    a processor in communication with the automatic control equipment and the database for receiving the measured data from the sensors of the automatic control equipment and the observational data from the database, the processor:
        quantifying a level of disorder of the measured data;
        computing a raster of the level of disorder of the measured data;
        determining a state of the at least one component of the industrial plant based at least in part upon the raster of the level of disorder of the measured data;
        controlling the automatic control equipment based on the determined state; and
        integrating the measured data and the observational data to build a description of a process condition over time of the at least one component.

2. The system of claim 1 in which the automatic control equipment constitutes a first system level, the processor and database constitute a second system level with the system including a third system level, being a management level.

3. The system of claim 2 in which the management level uses the information output from the processor for effecting control of the industrial plant.

4. The system of claim 2 in which the levels are configured to reduce a range in a number of operating variables of the plant.

5. The system of claim 1 which includes a classifier module in communication with the processor for classifying variations of operating variables of the plant into one of a predetermined number of classes of variations, the classifier module classifying variations in a process variable into one of three classes being: common cause or natural variation, special cause variation or structural variation.

6. The system of claim 1 in which, when the plant is an aluminium smelting plant, the automatic control equipment includes control inputs, wherein the control inputs comprise bath superheat sensors, bath resistivity sensors, sensors for monitoring and noting electrical current variation and characteristic frequencies, cell off-gas temperature and flow rate sensors, and the processor includes a causal framework for relating identified problems and cell process conditions to specific causes, the causal framework forming part of a learning algorithm of the processor which is improved and periodically updated over time using data from the database.

7. The system of claim 6 in which the observational data relates to an operational state of individual cells, the operational state being formally monitored and integrated into individual cell process conditions.

8. The system of claim 7 in which the processor and the database are operable to check the process condition for each cell individually with the database being updated periodically.

9. The system of claim 6 in which a management level employs causal trees containing the learning algorithm to provide a growing framework of decision support and, in the case of a smelting operation, cell diagnosis over time.

10. The system of claim 9 in which the processor further uses a complexity measure to assess predictability of process outcomes and the overall operation of the plant.

11. A method of controlling an industrial plant, the method comprising:
    monitoring operation of at least one component of the industrial plant by a plurality of sensors forming part of automatic control equipment;
    transferring measured data from the sensors and observational data relating to operation of the industrial plant to a processor, the observational data being obtained by plant personnel and relating to an operational state of the at least one component;
    accessing a database containing the measured data from the sensors and the observational data relating to operation of the industrial plant, as periodically updated by the processor;
    quantifying, automatically with the processor, a level of disorder of the measured data;
    computing, automatically with the processor, a raster of the level of disorder of the measured data;
    determining a state of the at least one component of the industrial plant, automatically with the processor, based at least in part upon the raster of the level of disorder of the measured data;
    controlling the automatic control equipment based on the determined state; and
    integrating, automatically with the processor, the measured data and the observational data to build a description of a process condition over time of the at least one component of the industrial plant.

12. The method of claim 11 which includes forming three system levels, the automatic control equipment constituting a first system level, the processor and database constituting a second system level and a third system level being a management level.

13. The method of claim 12 which includes using information output from the processor in the management level for effecting control of the industrial plant.

14. The method of claim 12 which includes configuring the levels to reduce a range in a number of operating variables of the plant rather than acting only to maintain the operating variables at arbitrary target levels.

15. The method of claim 14 in which the plant is an aluminium smelting plant and in which the method includes configuring the levels to achieve improvements in a number of operational aspects of the plant and using a causal framework to relate identified problems and process conditions to specific causes, integrating the causal framework into a learning algorithm of the processor which is improved and updated over time using data from the database and employing causal trees containing the learning algorithm to provide a growing framework of decision support and diagnosis of the at least one component over time.

16. The method of claim 15 which includes operating the plant within a range for each variable as determined by variability within a process carried out by the plant and which acts to reduce variation within each variable, key process variables, or both through identifying abnormal or systemic, damaging patterns of variation which can be related to a single dominant cause and correcting or minimising identified causes as appropriate, reducing the range of each process variable and improving process capability over time.

17. The method of claim 15 in which the observational data relates to an operational state of individual cells, the method including formally monitoring and integrating the operational state into individual cell process conditions.

18. The method of claim 11 which includes using a complexity measure to assess predictability of process outcomes and the overall operation of the plant.

* * * * *